United States Patent
Smallhorn

(12) 
(10) Patent No.: US 6,863,344 B2
(45) Date of Patent: Mar. 8, 2005

(54) SUPPORT FOR PASSENGER ENTERTAINMENT AND PERSONAL ELECTRONIC DEVICES MOUNTED IN AIRCRAFT SEAT TRACKS

(75) Inventor: George R. Smallhorn, Montreal (CA)

(73) Assignee: Inflight Canada Inc., Quebec (CA)

( * ) Notice: Subject to any disclaimer, the term of this patent is extended or adjusted under 35 U.S.C. 154(b) by 237 days.

(21) Appl. No.: 10/247,304

(22) Filed: Sep. 20, 2002

(65) Prior Publication Data

US 2004/0056160 A1 Mar. 25, 2004

(51) Int. Cl.[7] .............................. A47C 7/72; A47C 31/00
(52) U.S. Cl. ...................... 297/217.3; 297/162; 108/44; 244/118.5
(58) Field of Search ............................. 297/217.3, 160, 297/162, 144; 108/44; 244/122 R, 118.5, 118.6

(56) References Cited

U.S. PATENT DOCUMENTS

| | | | |
|---|---|---|---|
| 4,763,360 A | 8/1988 | Daniels et al. | |
| 4,853,555 A | 8/1989 | Wheat | |
| 5,409,186 A | 4/1995 | Chow | |
| 5,795,018 A | 8/1998 | Schumacher et al. | |
| 5,984,415 A | 11/1999 | Schumacher et al. | |
| 6,058,288 A | 5/2000 | Reed et al. | |
| 6,177,887 B1 | 1/2001 | Jerome | |
| 6,179,263 B1 | 1/2001 | Rosen et al. | |
| 6,305,644 B1 * | 10/2001 | Beroth | 244/118.5 |
| 6,427,957 B1 | 8/2002 | Finneman et al. | |
| 6,431,645 B2 * | 8/2002 | Massara et al. | 297/144 X |
| 6,601,798 B2 * | 8/2003 | Cawley | 244/118.6 |
| 6,719,343 B2 * | 4/2004 | Emerling et al. | 296/24.34 X |

FOREIGN PATENT DOCUMENTS

| | | | | |
|---|---|---|---|---|
| DE | 3719105 A | * | 12/1998 | ........... B64D/11/06 |
| DE | 199 01 858 A1 | | 7/2000 | |

* cited by examiner

Primary Examiner—Anthony D. Barfield
(74) Attorney, Agent, or Firm—Ogilvy Renault; Paul J. Field

(57) ABSTRACT

A support for entertainment or personal electronic equipment associated with a passenger seat mounted to a floor in a passenger cabin having a base adapted to anchor to the cabin floor laterally adjacent and forward of said seat. A post extends upwardly from the base and has an elongate pocket for housing each articulated support arm. A proximal end of the arm is mounted to the post and a distal end includes an equipment mount. Each arm has independent deployment from a stowed position housed within an associated pocket and a deployed position extending upwardly and laterally from the post toward a central portion of the associated passenger seat.

14 Claims, 8 Drawing Sheets

SUPPORT FOR PASSENGER ENTERTAINMENT AND PERSONAL ELECTRONIC DEVICES MOUNTED IN AIRCRAFT SEAT TRACKS

TECHNICAL FIELD

The invention relates to a support for passenger entertainment and personal electronic devices in an aircraft cabin mounted to the cabin floor within the seat tracks.

BACKGROUND OF THE ART

Aircraft passenger cabins are currently constructed or are being retrofit with a wide assortment of personal electronic and entertainment options accessible from the passenger seat. Passengers are encouraged to remain seated as much as possible during a flight for safety, crew mobility and to enable cabin service. To improve service and make the flight more enjoyable or productive, airlines may provide audio and video entertainment, telephone, intercom, television, video games, internet, email and electrical power supply for laptop computers, especially in business class and first class cabins thus permitting passengers to work during the flight, to communicate or to be entertained without leaving their seat or disturbing other passengers.

Passenger entertainment systems such as seat mounted flat screen video monitors, and credit card activated cellular telephones are now commonly mounted in the seat backs and seat arm rests of passenger aircraft. Some airlines also distribute compact personal DVD players with a choice of movies, or personal audio CD players in first class and business class cabins. Passengers may carry their own laptop computers or CD players and seek power outlets to preserve batteries and extend use during long flights.

Within the confines of a passenger seat fitted with a conventional food service tray table, use of such entertainment and personal electronic equipment creates conflicts with the food and beverage service in an aircraft cabin. The available space is often inadequate, the electrical equipment is exposed to spillage of beverages, and equipment may be damaged after sliding off the tray table on to the cabin floor.

Given existing aircraft cabins and seating arrangements, conventionally it has been considered necessary to fit all such equipment within the passenger seat itself. Armrests and seat backs are built with compartments for such purposes adding to the cost of the seats and requiring regulatory approval since the weight, centre of gravity and performance during a crash could be effected by adding the weight of equipment or modifying the seat frame structure. Airlines desiring to upgrade service by providing electric power, entertainment and personal electronic device capacity are faced with the problem of replacing expensive passenger seats before their service life has ended and submitting new designs for regulatory approval, both of which consume significant time and money.

Conventionally, passenger seat units are often fitted with power sources, entertainment and personal electronic system units that are mounted in armrests, in consoles, in the seat back or under the seat as an interim measure.

It is an object of the present invention to separate the provision of passenger entertainment and personal electronic devices entirely from the passenger seats.

It is a further object of the invention to provide a compact foldable support that includes housing for electrical components and cables thereby relieving the passenger seats of the need to be redesigned or retrofit to accommodate entertainment or personal electronic functions.

Further objects of the invention will be apparent from review of the disclosure, drawings and description of the invention below.

DISCLOSURE OF THE INVENTION

The invention provides a support for entertainment or personal electronic equipment associated with a passenger seat mounted to a floor in a passenger cabin having a base adapted to anchor to the cabin floor laterally adjacent and forward of said seat. A post extends upwardly from the base and has an elongate pocket for housing each articulated support arm. A proximal end of the arm is mounted to the post and a distal end includes an equipment mount. Each arm has independent deployment from a stowed position housed within an associated pocket and a deployed position extending upwardly and laterally from the post toward a central portion of the associated passenger seat.

A significant benefit of the invention is that existing seats or existing seat designs need not be changed in order to accommodate newly added services, such as personal video entertainment, laptop computer power, virtual reality video games, email, internet capacity or other such entertainment and personal electronic services within the confines of the immediate passenger airline seat area. The invention provides a completely independent stand alone support that is independently supported within the seat tracks of the cabin floor to support various devices such as flat screen video monitors or DVD players as well as accommodating power source units within the base of the support, associated cables and receptacles in a compact protected foldable unit.

Therefore, it is no longer necessary for airlines to consider replacing existing seats in the passenger cabin or purchasing newer more expensive seat designs nor for modifications to the seats to require testing and regulatory approval in order to provide entertainment and personal electronic services to the passengers. The invention provides an independent stand-alone support unit with protective enclosure of electrical components, which can be modified to house and support any such entertainment or personal electronic device.

A further advantage of the invention is the flexibility of design that aircraft operators can achieve through complete separation of the seating function and the entertainment or personal electronic function within the cabin. More particularly, the seats can be designed for maximum safety, service life and passenger comfort without premature replacement. Seats can be used throughout their entire functional operating life without considering upgrades or modification to the entertainment or personal electronic systems. Audio and video signals can be conveyed to the independent support that houses video displays for example and includes receptacles or jacks for headphones completely independently of the seat. In addition, the support has sufficient housing capacity for housing power sources to plug in laptop computers or CD players for example. The airline operator can quickly reconfigure the cabin (for charters, long haul or short commuter flights), adding or removing entertainment or personal electronic services by simply installing or removing the independent support unit. Seats need not be modified at all unless the seat pitch is to be changed.

In contrast, seat designs that require modification to include fold up video display monitors or additional audio equipment for example often suffer from a change in the seat's centre of gravity or from other structural modifications to the seats to accommodate the added equipment. Any such change requires significant regulatory approval or testing since the seat and lap belt are safety features of the aircraft in any crash scenario. The primary functions of the seats are to provide comfort and safety and therefore any modification requires approval to ensure that there has been no compromise of structural integrity or safety features.

Further, airlines often acquire aircraft from other airlines through mergers or purchases and require that all of their aircraft provide a consistent level of passenger service throughout the fleet. In such circumstances, retrofitting of passenger seats to accommodate entertainment and personal electronic devices may be a costly exercise. The invention provides a simple solution enabling retrofitting of existing aircraft or reconfiguring of aircraft with a rapid turn around. For example, entertainment and personal electronic devices are usually more desirable on long haul flights while use of the same aircraft for commuter flights places a premium on cabin space and number of passengers per aircraft. Reconfiguration to provide such services is relatively simple when the invention is used since the independent supports may be installed and removed very quickly to reconfigure the aircraft, whereas conventional reconfiguration involves removing and replacing the entire seat assembly.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
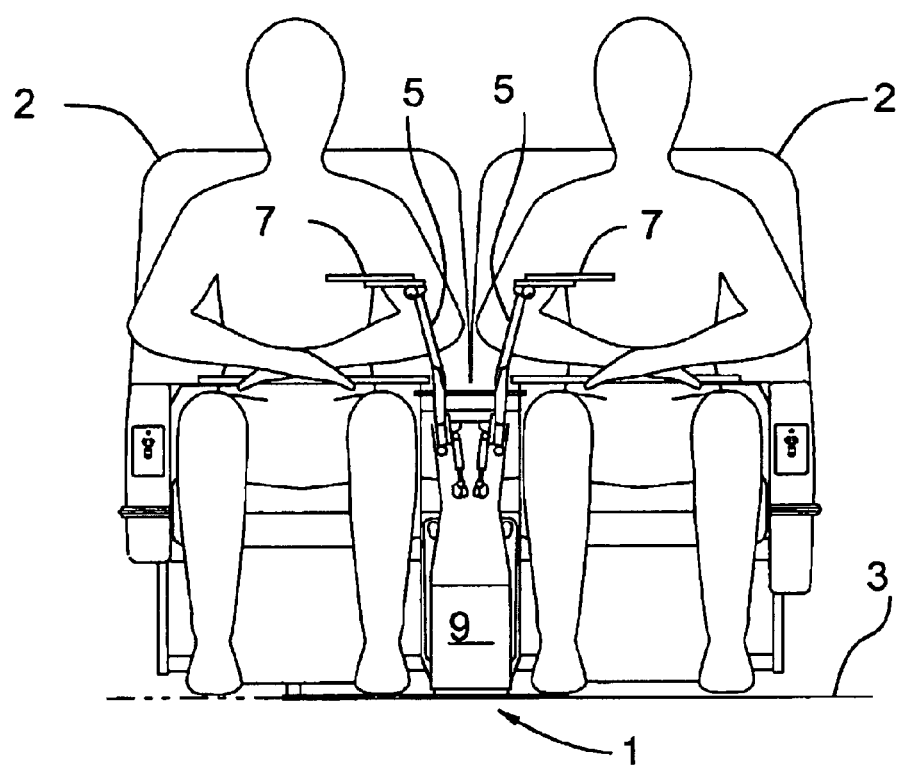
FIG. 1 shows an elevation view of a two passenger seat assembly with conventional tray table located at lap height with the invention provided between the two seats with an equipment supporting table extending upwardly and laterally on two articulated arms that can be individually folded downwardly in a stowed position within pockets in the support post.
Figure 2:
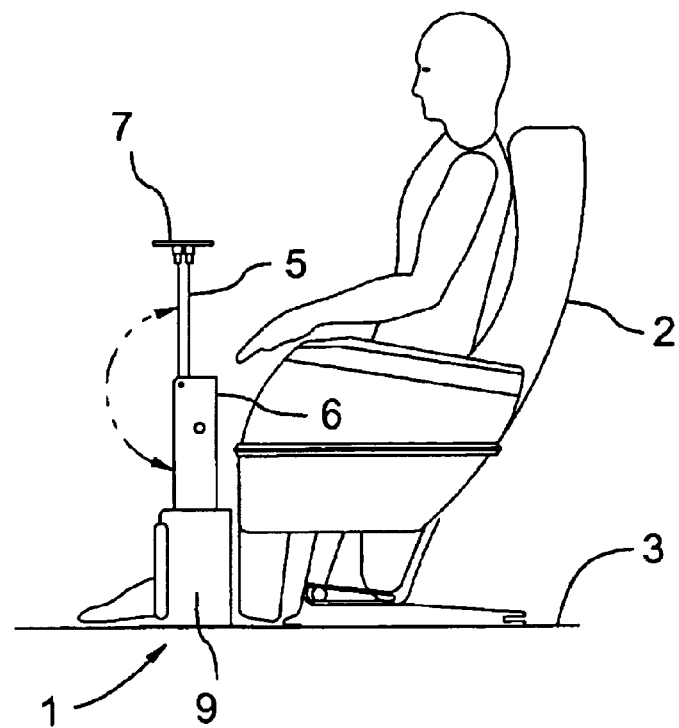
FIG. 2 is a side elevation view of the arrangement shown in FIG. 1.
Figure 3:
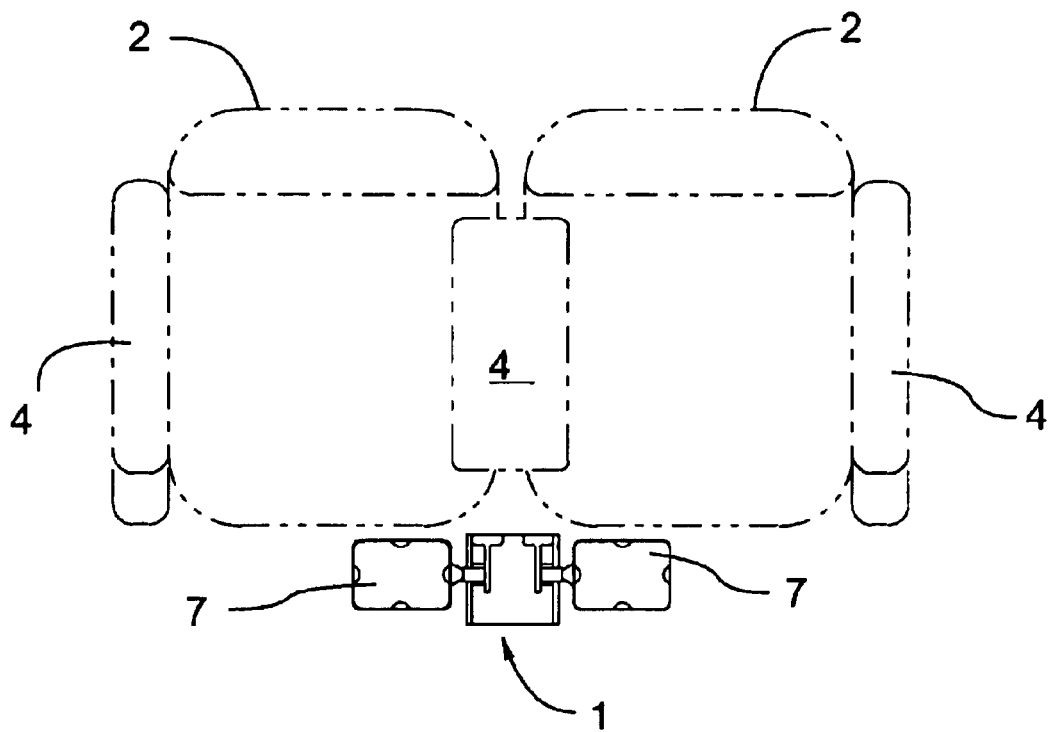
FIG. 3 is a top plan view thereof.

Referring to FIGS. 1 through 4, the invention provides a support 1 for equipment such as entertainment and personal electronic devices that are associated with a passenger seat 2 mounted to the floor 3 in the passenger cabin. With reference to FIG. 3, conventional passenger seats 2 include arm rests 4 that may conventionally have hinged compartment doors in their top surface to house foldable articulated arms with flat screen video displays. Most armrests also conventionally include jacks for head phones to access the aircraft audio system as well as other personal electronic devices to page a cabin attendant, light switches etc. built in to conventional passenger seats 2.

The invention however provides a stand alone support 1 that has upwardly extending articulated arms 5 that fold downwardly into a stowed position within the post 6 of the support 1 and optionally include an equipment mount table 7. The embodiment shown includes a flat table 7 as a means to mount entertainment and personal electronic equipment with extension leaves 8 slidably disposed on lateral edges of the table to accommodate a personal DVD player or CD player for example. However, it will be understood that the invention is not limited to provision of a table 7, but also includes other means to mount various types of equipment such as a flat screen video monitor, LED display or even a 3-D virtual reality helmet for playing video games for example. The base 9 of the support 1 is large enough to house a life vest storage compartment and to house electrical components such as power supply units 22 or other electronic components.

Figure 5:
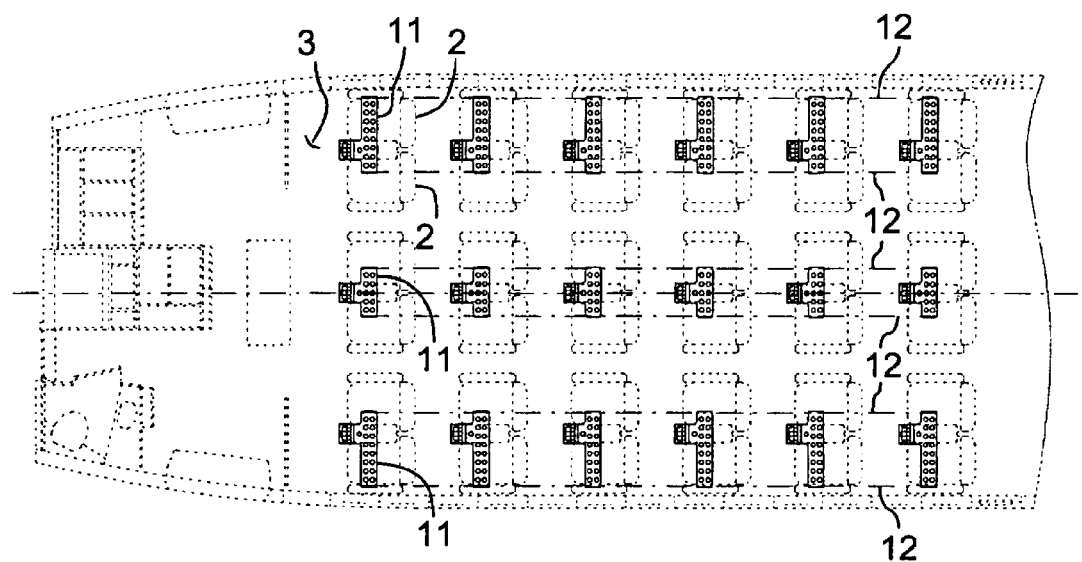
FIG. 5 is a plan view of a passenger cabin of an aircraft showing six parallel seat supporting tracks that extend longitudinally for connecting seat legs and showing an adapter plate mounted to the seat tracks which is also bolted to the base of the equipment support between the two seats of each two seat assembly.
Figure 6:
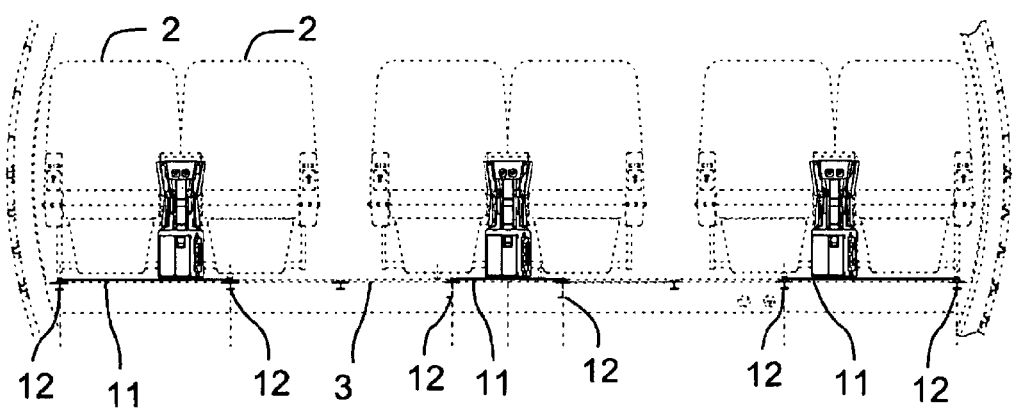
FIG. 6 is a front elevation view of the arrangement shown in FIG. 5 indicating the location of seat tracks that anchor three pairs of passenger seats to the cabin floor structure.
Figure 12:
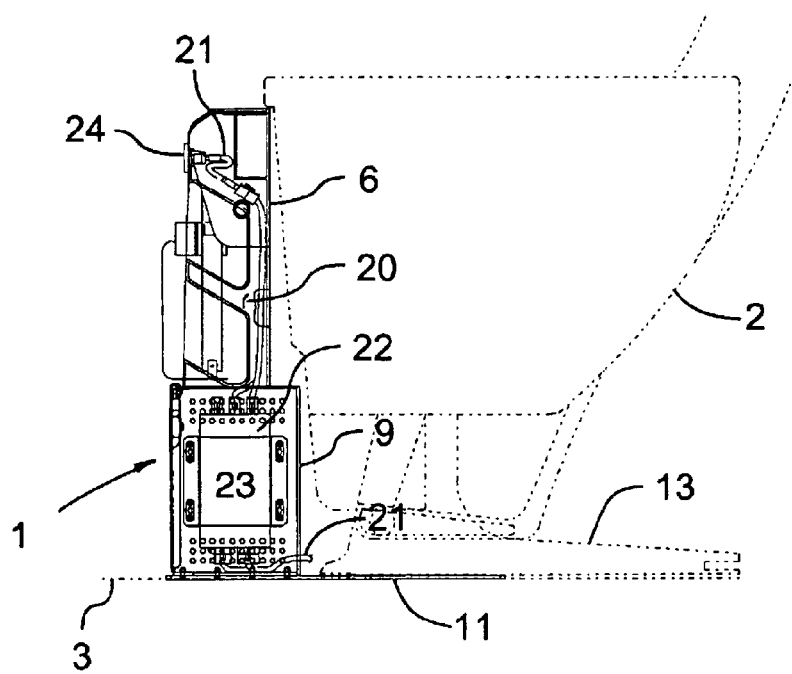
FIG. 12 is a partial sectional elevation view showing housing of an electrical power source within the base of the support and showing the cable raceway extending cable from the power source to a receptacle in the top portion of the post.

With reference to FIGS. 5 and 6, it will be appreciated by those skilled in the art that drilling holes in the existing cabin floor 3 not only involves significantly expense and disruption to the cabin interior but also may involve weakening of the cabin floor 3 structure in some aircraft. Therefore, it is much preferable to utilize an adapter plate 11 which can be disposed under the cabin carpet and between the metal legs supporting the passenger seats 2 and anchored in existing seat traps 12. The seat tracks 12 are recessed in the cabin floor 3 surface and enable the passenger seats 2 to be positioned longitudinally at any point along the track 12 in a rapid manner. The invention therefore preferably utilizes the adapter plate 11 that is also bolted to the track 12 beneath the metal legs of the seats 2. The embodiment in FIG. 5 shows that the adapter plates 11 include large circular cut outs in order to reduce their weight, which is a critical concern in aircraft applications. FIG. 12, shows the adapter plate 11 resting on the cabin floor 3 and bolted to the base 9 of the support 1. The metal legs 13 of the passenger seats 2 clamp the plate 11 in position.

With reference to FIGS. 7, 8, 13, 14 and 15, the basic sheet metal structure of the support 1 can be seen. The support 1 includes a base 9 anchored to the tracks 12 in the cabin floor 3 with an adapter plate 11. The base 9 is disposed laterally adjacent and forward to the passenger seats 2 that are served by the support 1.

Extending upwardly from the base 9 is a post 6, which includes two elongate pockets 14 within which the articulated support arms 5 are shown (in FIGS. 7 and 8) in the stowed position. A proximal end of each support arm 5 is pivotally mounted to a top portion of the post 6 with a T-bracket 15. The distal end of the arm 5 includes the equipment support table 7, which is also shown in the stowed position.

Figure 9:
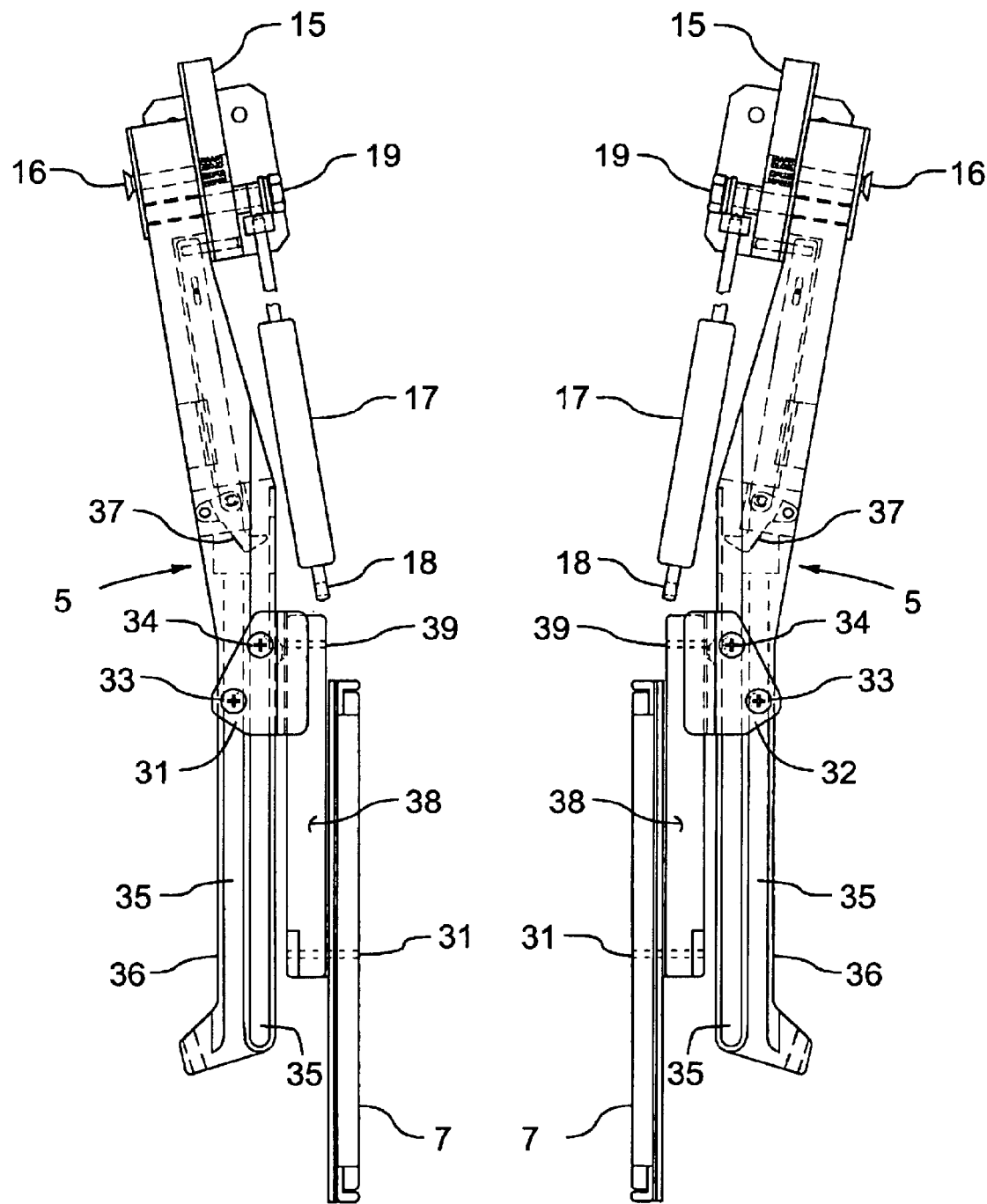
FIG. 9 is a detailed view of the articulated arms in a stowed position.

FIG. 9 shows an improved detailed view of the articulated arms 5. It can be appreciated that each arm 5 is independently deployable and pivotally mounted to an associated T-bracket 15 to rotate about the shoulder bolt 16. A gas spring 17 resiliently biases the articulated arm 5 to the deployed position (shown in FIG. 1). A lower end 18 of the gas spring 17 is pivotally mounted to the post 6 on a small bracket while the upper end 19 is pivotally connected to the arm 5 at a short distance from the shoulder bolt 16. The gas spring 17 exerts a rotary force to resiliently bias the arm 5 toward the deployed position.

Therefore, each arm 5 has independent deployment means for transferring the associated arm 5 from the stowed position (shown in FIGS. 7, 8 and 9) housed within the associated pocket 14 of the post 6 to the deployed position (shown in FIGS. 1, 2 and 3) extending upwardly and laterally from the post 6 toward a central portion of the associated seat 2.

Figures 13, 14:
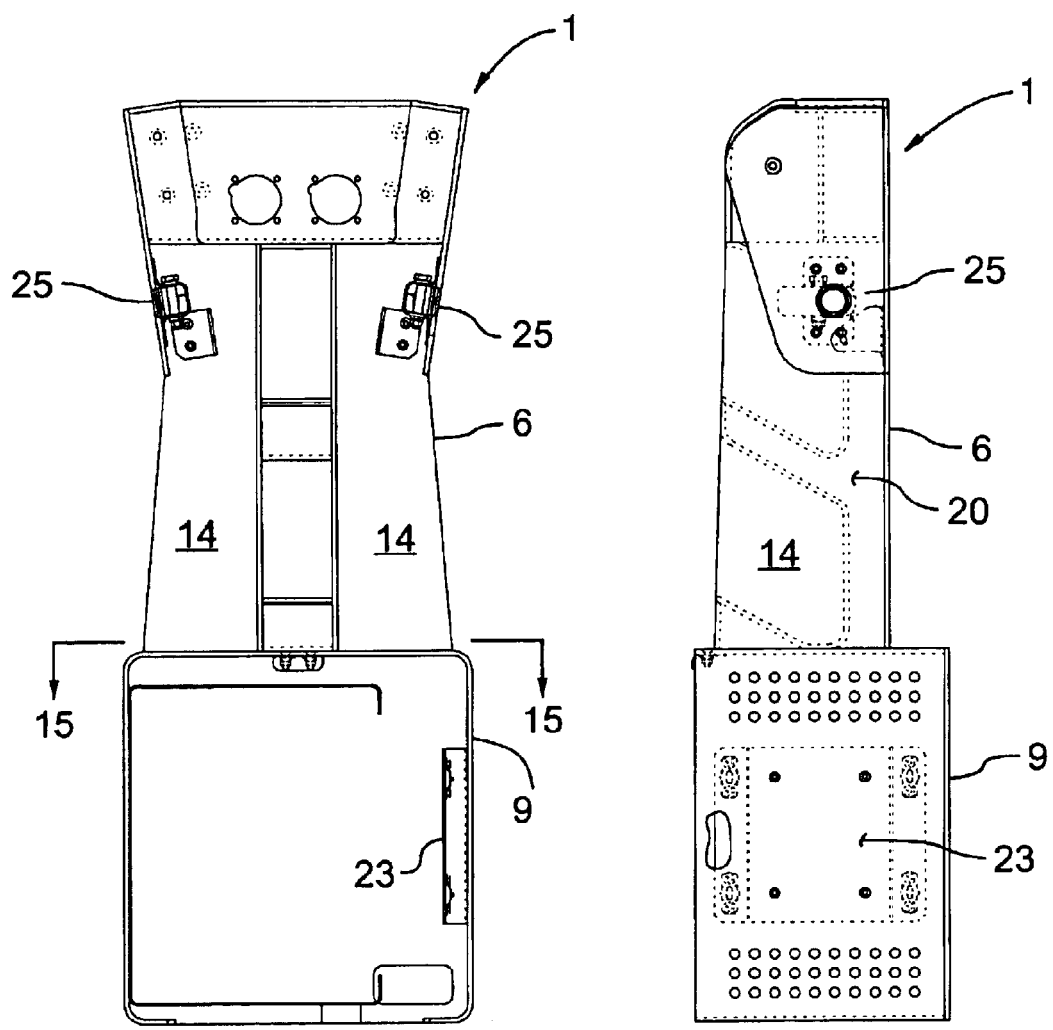
FIG. 13 is a frontal elevation view of the support with front compartment door removed to show mounting for the power source and storage compartment for the life vests as well showing a spring loaded latch to retain the articulated arms in the stowed position.
FIG. 14 is a side view of the detail shown in FIG. 13.
Figure 15:
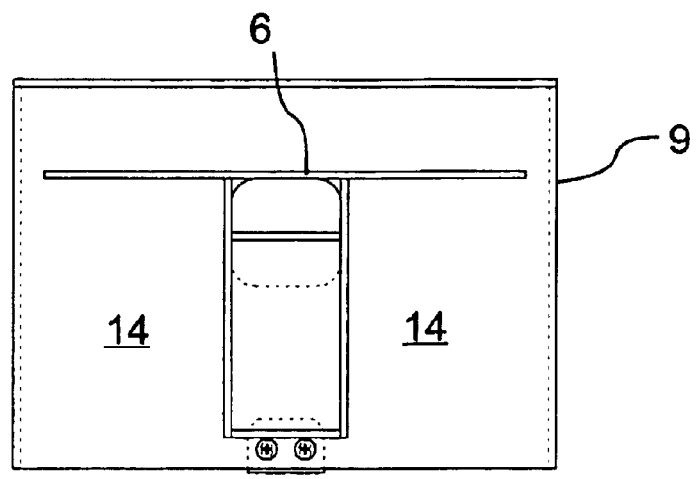
FIG. 15 is a sectional view along lines 15—15 of FIG. 13.
Figure 16:
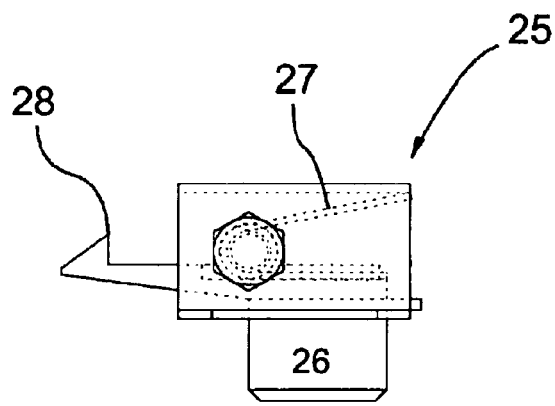
FIG. 16 is a top plan view of the spring loaded latch that detains the articulated arms in the stowed position.
Figure 17:
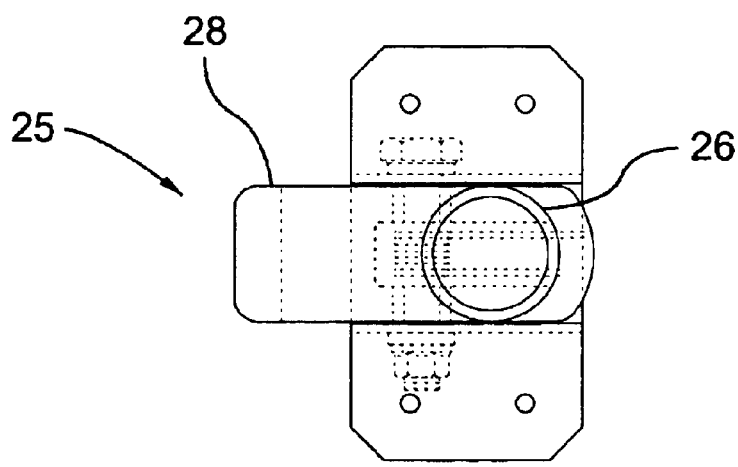
FIG. 17 is a detailed elevation view of the latch.

As shown in FIGS. 12 and 14, the post 6 preferably includes a cable raceway 20 housing at least one cable 21 extending between the base 9 and the top portion of the post 6. In the embodiment shown, the base 9 houses an electrical power supply unit 22 held in place with a bracket 23 that is provided with a power receptacle 24 in communication with the cable 21 to provide power for laptop computers for example. Cables from the base 9 to the aircraft services can be hidden beneath the carpet, under the floor or in floor mounted raceways.

Figure 8:
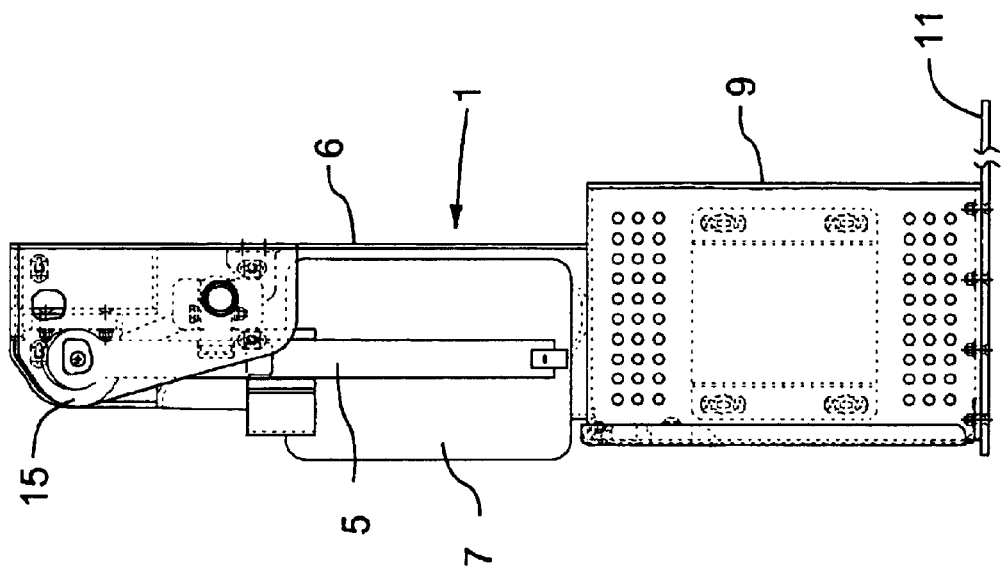
FIG. 8 is a side elevation view of the stowed position shown in FIG. 7.
Figure 7:
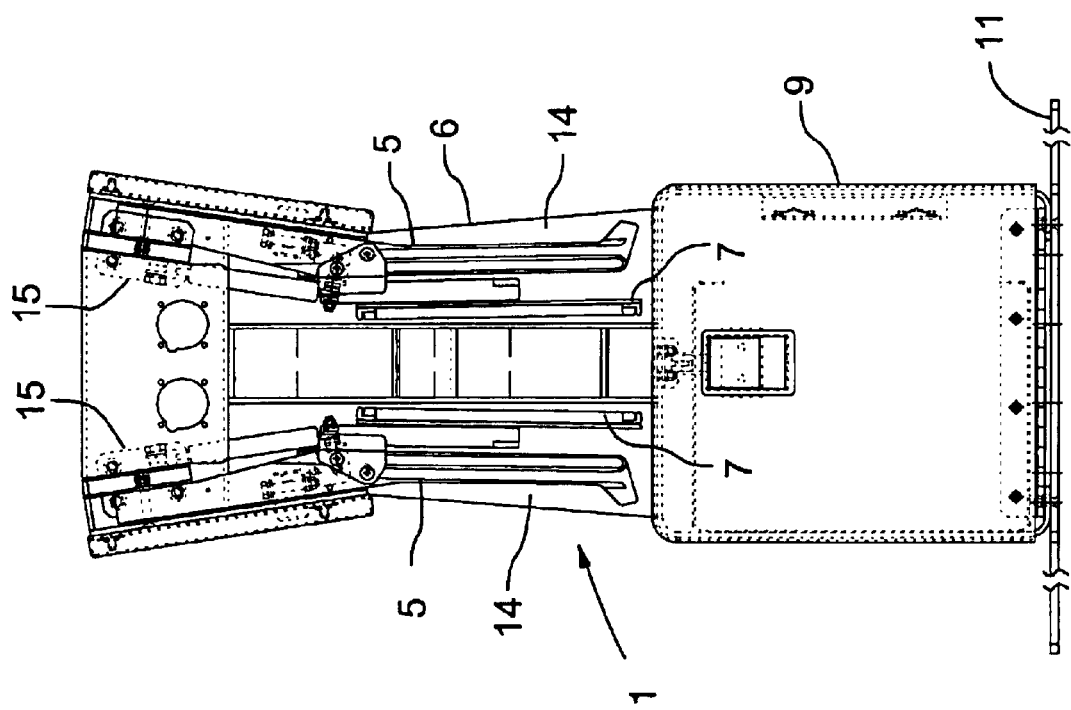
FIG. 7 is a detailed frontal view of a support according to the invention showing the base with a life vest storage compartment and two articulated arms with equipment support tables in the stowed position.

As best seen in FIGS. 13, 14, 16 and 17, the pocket 14 also preferably includes a latch 25 for releasably detaining the arm 5 in the stowed position (shown in FIGS. 7 and 8). As seen in the detailed views of FIGS. 16 and 17, the latch 25 includes a manual button 26 which is spring loaded to the catch position shown in FIG. 16 to resiliently detain the arm 5. Depressing the button 26 against the force of spring 27 releases the arm 5 from dog 28. The arm 5 is resiliently biased by the gas spring 17 to the deployed position and when free of the latch 25 rotates upwardly.

Figure 4:
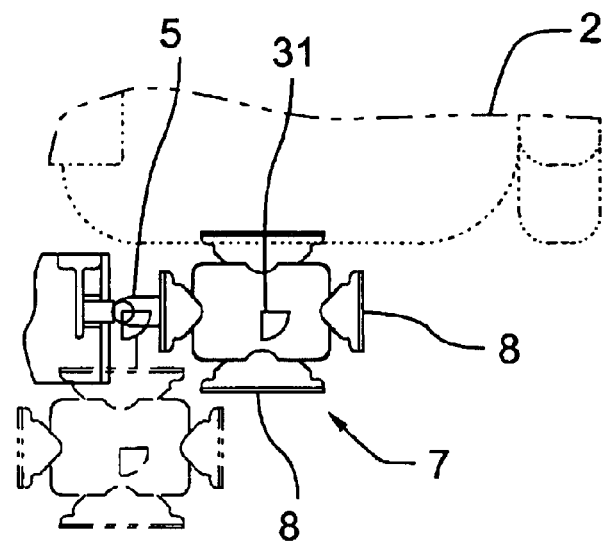
FIG. 4 is a detail view of the table showing the ability to pivot in a horizontal plane and showing four table leaves slidably disposed in the side edges of the table to extend the support surface.
Figure 10:
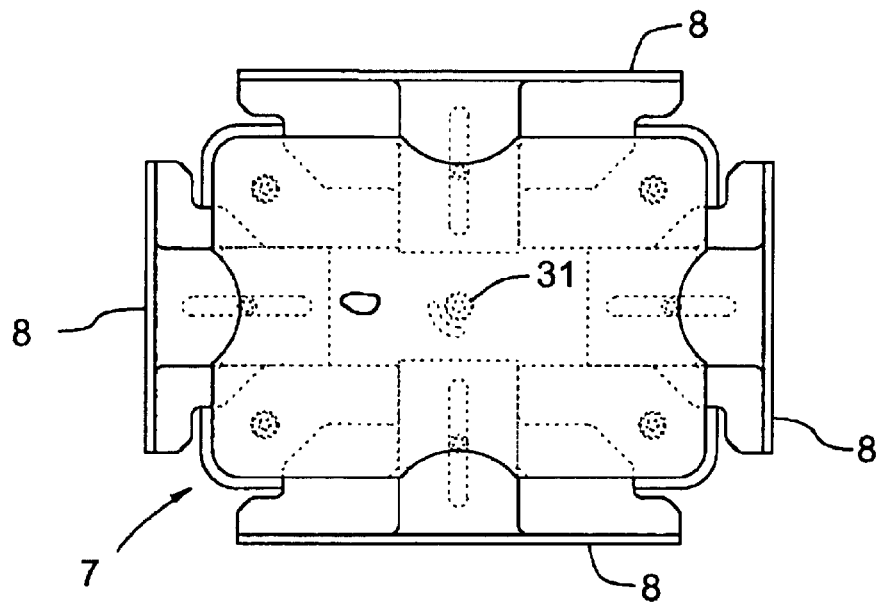
FIG. 10 is a plan view of the equipment support table with extension leaves shown in the extended position.
Figure 11:
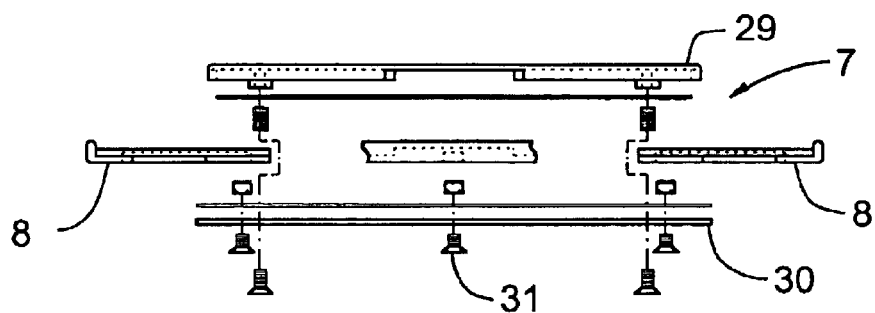
FIG. 11 is an exploded elevation view of the equipment support table of FIG. 10.

With reference to FIGS. 4, 10 and 11, an equipment support table 7 is constructed of an upper plate 29 and a lower plate 30 which sandwich together the sliding table leaves 8. As well, the table 7 can rotate about a bolt 31 (shown in FIG. 4) that rotatably connects the table 7 to the distal end of the articulated arm 5.

Turning to the detailed view of the articulated arms 5 in FIG. 9, the arm 5 can telescope longitudinally by means of a carriage 32 with pins 33 and 34 sliding in tracks 35 of a first arm segment 36. Carriage release dog 37 holds the carriage 32 in the stowed position until sufficient rotation occurs about bolt 16 when the latch 25 is released to release the carriage release dog 37. Under the biased force of the gas spring 17, rotation occurs and the arm 5 rotates upwardly about the shoulder bolt 16. At a predetermined position above a level plane, the carriage release dog 37 releases the carriage 32 and the carriage 32 can manually slide on pins 33 and 34 in the tracks 35. When the trailing pin 34 reaches the closed end of its track 35, the leading pin 33 is released from the track 35 and permits table 7 and the second arm segment 38 (which is pivotally mounted to the carriage 32 with bolt 39) can rotate about the trailing pin 34 to the deployed position of FIGS. 1 and 2.

Of course, to move from the deployed position shown in FIGS. 1 and 2 to the stowed position shown to FIGS. 7 and 9 for example, the passenger manually rotates the table 7, second arm segment 38 and carriage 32 about trailing pin 34, then re-engages leading pin 33 into its track 35 to slide the carriage 32 relative to the first arm segment 36 and to engage the carriage 32 on the carriage release dog 37 simultaneously rotating the arm 5 about the shoulder bolt 16 against the resilient biasing force exerted by the gas spring 17. Once sufficiently rotated, the arm 5 engages the spring loaded dog 28 of the latch 25 and is held in the stowed position until the button 26 of the latch 25 is released again. Gas spring 17 are preferred for this application of course because they provide a slow controlled motion.

Although the above description relates to a specific preferred embodiment as presently contemplated by the inventor, it will be understood that the invention in its broad aspect includes mechanical and functional equivalents of the elements described herein.

I claim:

1. A support, for supporting passenger accessible equipment adjacent to an aircraft passenger seat, the passenger seat being removably mounted to elongate seat tracks aligned longitudinally within an aircraft passenger cabin floor, the support comprising:

a base having an adaptor plate with seat track anchoring connectors;

a post extending upwardly from the base including at least one elongate pocket; and at least one support arm with a proximal end mounted to said post and a distal end including an equipment mount, each arm having independent deployment means for transferring the associated arm from a stowed position housed within an associated pocket and a deployed position extending upwardly and laterally from said post.

2. A support according to claim 1 wherein the adapter plate is adapted to fit between the cabin floor and at least one passenger seat leg.

3. A support according to claim 1 wherein the base includes an electrical component housing.

4. A support according to claim 1 wherein the post includes a cable raceway housing a cable between the base and a top portion of the post.

5. A support according to claim 4 wherein the top portion of the post includes a receptacle in communication with said cable.

6. A support according to claim 1 wherein said pocket includes latch means for releasably detaining said arm in the stowed position.

7. A support according to claim 1 wherein the proximal end of the arm is pivotally mounted to a top portion of said post.

8. A support according to claim 7 wherein the arm is resiliently biased to said deployed position.

9. A support arm according to claim 8 wherein the post includes a gas spring extending between the post and the arm at a distance from the proximal end thereof.

10. A support arm according to claim 1 wherein the arm telescopes longitudinally.

11. A support according to claim 1 wherein the arm includes carriage means disposed on a first arm segment for mounting a second arm segment to slide and to rotate relative to said first arm segment.

12. A support according to claim 1 wherein the equipment mount comprises a table.

13. A support according to claim 12 wherein the table includes extension leaves slidably disposed in lateral edges thereof.

14. A support according to claim 1 wherein the base includes a life vest storage compartment.

* * * * *